United States Patent
Scheffer et al.

(10) Patent No.: US 7,965,359 B2
(45) Date of Patent: Jun. 21, 2011

(54) SELF-COMPENSATING, QUASI-HOMEOTROPIC LIQUID CRYSTAL DEVICE

(75) Inventors: Terry J. Scheffer, Hilo, HI (US); Jiuzhi Xue, Broomfield, CO (US)

(73) Assignee: Cuspate, LLC, Hilo, HI (US)

( * ) Notice: Subject to any disclaimer, the term of this patent is extended or adjusted under 35 U.S.C. 154(b) by 331 days.

(21) Appl. No.: 12/375,899

(22) PCT Filed: Jul. 26, 2007

(86) PCT No.: PCT/US2007/074492
§ 371 (c)(1),
(2), (4) Date: Jan. 30, 2009

(87) PCT Pub. No.: WO2008/019227
PCT Pub. Date: Feb. 14, 2008

(65) Prior Publication Data
US 2009/0262291 A1    Oct. 22, 2009

Related U.S. Application Data

(60) Provisional application No. 60/835,586, filed on Aug. 3, 2006.

(51) Int. Cl.
*G02F 1/1335* (2006.01)
(52) U.S. Cl. ........ 349/117; 349/118; 349/119; 349/123; 349/134
(58) Field of Classification Search .......... 349/117–119, 349/123, 134
See application file for complete search history.

(56) References Cited

U.S. PATENT DOCUMENTS

| | | | |
|---|---|---|---|
| 5,936,697 A * | 8/1999 | Yang | 349/180 |
| 6,141,075 A | 10/2000 | Ohmuro et al. | |
| 2003/0020857 A1* | 1/2003 | Konno et al. | 349/123 |
| 2004/0165128 A1 | 8/2004 | Vithana | |
| 2004/0218137 A1* | 11/2004 | Lee et al. | 349/178 |
| 2004/0257508 A1* | 12/2004 | Van De Witte et al. | 349/134 |

OTHER PUBLICATIONS

ISR for PCT/US07/74492, Jun. 2008.*
Shin-Tson Wu, Chiung-Sheng Wu, and Kun-Wei Lin, Chiral-homeotropic liquid crystal cells for high contrast and low voltage displays, *J. Appl. Phys.*, 82 (10), Nov. 15, 1997, pp. 4795-4799, 1997 American Institute of Physics.

(Continued)

*Primary Examiner* — David Nelms
*Assistant Examiner* — Phu Vu
(74) *Attorney, Agent, or Firm* — Stoel Rives LLP

(57) ABSTRACT

Self-compensating, quasi-homeotropic liquid crystal devices (100, 200, 300, 400) overcome the contrast reducing effects of smaller pretilt angles. The devices exhibit extremely high contrast ratio but at the same time suppress fringe field-induced disclination lines in high pixel density and small pixel size quasi-homeotropic displays. The surface pretilt (520, 540) and cell twist (570) angles are set at values that, in combination, contribute to establishing a cuspate singularity in the contrast ratio for normally incident light in response to a drive signal switching the liquid crystal device to the OFF director field state that provides nearly 0% optical efficiency. The OFF director field state corresponds to a subthreshold drive level that provides for the liquid crystal device self-compensation for in plane optical retardation. Setting the cell gap ("d") to provide substantially 100% optical efficiency in response to a value of the drive signal switching the liquid crystal device to the ON director field state achieves optimal dynamic range for the liquid crystal device.

23 Claims, 14 Drawing Sheets

OTHER PUBLICATIONS

Koji Akiyama, Akio Takimoto, Hisahito Ogawa, Photoaddressed spatial light modulator using transmissive and highly photosensitive amorphous-silicon carbide film, *Applied Optics*, vol. 32, No. 32, Nov. 10, 1993, pp. 6493-6500, 1993 Optical Society of America.

Richard I. McCartney, 48.3: A Liquid Crystal Display Response Time Compensation Feature Integrated into an LCD Panel Timing Controller, *SID 03 Digest*, pp. 1350-1353, 2003 SID.

K. H. Yang, LP-B: A Self-Compensated Twisted Nematic Mode for Reflective Light Valves, *Euro Display '96*, pp. 449-451.

* cited by examiner ature of the applied electric field. For this reason, quasi-homeotropic devices are generally operated with an alternating square wave voltage between two drive voltages, V1 and V0, at a frequency that is typically between 60 Hz and a few hundred Hz, V1 being the ON state drive voltage and V0 being a subthreshold voltage that is not zero.
US 7,965,359 B2

SELF-COMPENSATING, QUASI-HOMEOTROPIC LIQUID CRYSTAL DEVICE

RELATED APPLICATION

This application claims benefit of U.S. Provisional Patent Application No. 60/835,586, filed Aug. 3, 2006.

TECHNICAL FIELD

The present invention relates to liquid crystal devices and, in particular, to a quasi-homeotropic liquid crystal device that is configured to suppress disclination line defects and to self compensate for in-plane optical retardation and thereby exhibit an extremely high contrast ratio and rapid electro-optic response.

BACKGROUND INFORMATION

Liquid crystal devices comprise two generally parallel substrate surfaces that are spaced apart by a cell gap filled with a layer of liquid crystal material to form a liquid crystal cell. The substrates can be conditioned on their inner surfaces to define the alignment of the liquid crystal directors contacting these surfaces. Use of liquid crystal devices is prevalent in display systems. In one category of liquid crystal display, electrodes for applying a longitudinal electric field are located on the inner surface of each substrate, the liquid crystal material has a positive dielectric anisotropy, and the substrate inner surfaces are conditioned to cause the liquid crystal directors to align parallel to the surfaces or at a small angle relative to them. An example of such a display would be the reflective, self-compensating twisted nematic (SCTN) mode display described by K. H. Yang, *Eurodisplay*, 449-451 (1996). The SCTN display has a twist angle from 60° to 65°, and the polarization direction of incident linearly polarized light bisects the twist angle of the SCTN cell. The name self-compensating is chosen because, in the electrically switched ON state, which is the optically dark state, the phase shift introduced between the linear polarized light components by the retardation of the upper boundary layer is modified by the retardation of the lower boundary layer such that the polarization components are again in phase. An SCTN mode display is reported by Yang to have a contrast ratio exceeding 270. Although a contrast ratio of 270 was considered in 1996 to be a high value, it would now be considered inadequate for front or rear projection TV applications, in which contrast ratios of over 2000 are commonplace.

In another category of liquid crystal displays, electrodes for applying a longitudinal electric field are located on the inner surface of each substrate, the liquid crystal material has a negative dielectric anisotropy, and the substrate inner surfaces are conditioned to cause the liquid crystal directors to align vertically, or nearly vertically, to the plane of the substrate surfaces and thereby form a surface tilt angle or pretilt angle up to 90°. These types of displays are referred to as Vertically Aligned (VA) mode, homeotropic, or quasi-homeotropic displays and promise higher contrast ratios than those available in the SCTN mode. This category of display can operate in either the transmissive mode or the reflective mode. An example of such a transmissive mode display would be the screens used in many of the currently available flat panel computer monitors and TVs. Reflective mode displays include certain Liquid Crystal on Silicon (LCoS) imaging devices that are used in near-eye and projection applications.

When the liquid crystal directors contacting the substrate surfaces are aligned perfectly vertical to the substrate surfaces, the surface noncontacting directors throughout the layer, including the layer midplane, are also aligned perfectly vertical. For this special case, there is no birefringence imparted to light propagating along the direction normal to the surfaces of the substrates. Light leakage in this state can be very small across a pair of crossed polarizers, leading to an extremely high contrast ratio, because it is limited only by effectiveness of the light polarizer system used. However, this perfectly vertical director configuration is not practical for displays because, when an electric field is applied to tilt the directors to switch the display to the ON or optically bright state, there is no defined direction for the directors to tilt. This tilt ambiguity leads to unpredictable domain lines and dark regions throughout the layer.

This tilt ambiguity can be overcome by conditioning the substrate surfaces to decrease the pretilt angle from 90° to a smaller value, thereby breaking the symmetry and producing the so-called quasi-homeotropic director configuration. Such a pretilt angle can be generated, for example, by coating the surface with a special polymer, such as the SE-1211 alignment polymer available from Nissan Chemical Industries, Ltd., and unidirectionally rubbing it with a velvet cloth. Alternatively, the substrate surface can be conditioned by vacuum deposition of a material such as $SiO_2$ from one or more oblique angles. Applying an electric field to such a quasi-homeotropic structure results in a predictable and well-defined director field throughout the entire liquid crystal layer, leading to a uniformly bright display free from any domains or dark regions. But the introduction of a pretilt angle of less than 90° reduces the display contrast ratio because light propagating normally to the substrate surface planes encounters in-plane retardation, which introduces light leakage in the electrically switched OFF or optically dark state.

Although a pretilt angle very close to 90° is sufficient to break the vertical symmetry, an 85° or even smaller pretilt angle is generally needed in practical displays. This is so because in a practical display device, whether it is a direct view TFT LCD device or a small form factor LCoS imaging device designed for HDTV, the display is comprised of many small pixels and the electric fringe fields generated between the pixels can cause the surface noncontacting liquid crystal directors to tip in the wrong direction and introduce objectionable disclination domains. These domains introduce not only dark, objectionable patterns in a bright pixel, but also very long electro-optic responses that are highly undesirable and cause such phenomena as "tailing." Smaller pretilt at substrate surfaces will tend to suppress the appearance of the disclination lines that result from fringe fields. However, even pretilt angles in the 85°-88° range also cause significant decrease in contrast ratio. Such decrease in contrast ratio is likely to be even greater for LCoS imaging devices because the larger fringe fields generated by the smaller pixels may require pretilt angles as small as 75° to suppress the objectionable domains.

To make the situation worse, the OFF state of the quasi-homeotropic display is generally operated not at 0 volts but rather at a subthreshold drive voltage, V0, to secure an optimal ON state drive voltage, V1, that lies within the dynamic range limitations V1-V0 of the drive circuitry. A non-zero subthreshold voltage introduces a further decrease in contrast ratio because, lacking a true threshold, the surface noncontacting directors are tilted even more than they would be at zero volts, which further increases the in-plane retardation.

SUMMARY OF THE DISCLOSURE

Preferred embodiments of the disclosed liquid crystal device overcome the contrast reducing effects of a smaller pretilt angle in a quasi-homeotropic display, allowing for uniform, domain-free, high-brightness and fast-switching performance with an extremely high contrast ratio limited by the quality of the light polarizer system used. The preferred embodiments implement a device design that exhibits extremely high contrast ratio but at the same time suppresses fringe field-induced disclination lines in high pixel density and small pixel size quasi-homeotropic displays, thereby eliminating slow dynamics caused by such topological defects. The preferred embodiments achieve this performance even when the dark state of the display is operating at a non-zero, subthreshold OFF director field state drive voltage, V0.

Preferred embodiments overcome the contrast reducing effects of smaller pretilt angles in a quasi-homeotropic display. The surface pretilt angle and cell twist angle are set at values that, in combination, contribute to establishing a cuspate singularity in the contrast ratio for normally incident light in response to a drive signal switching the liquid crystal device to the OFF director field state that provides nearly 0% optical efficiency. The OFF director field state corresponds to a subthreshold drive level that provides for the liquid crystal device self-compensation for in-plane optical retardation. Setting the cell gap to provide substantially 100% optical efficiency in response to a value of the drive signal switching the liquid crystal device to the ON director field state achieves optimal dynamic range for the liquid crystal device. In another preferred embodiment, the cell thickness is chosen to be smaller than that which provides 100% optical efficiency to achieve, for example, a faster switching device. In this preferred embodiment, the optical efficiency in the OFF state is still near 0% while the optical efficiency in the ON state may be less than 100%.

The operation of the preferred embodiments depends upon the ON and OFF director field states, and particularly on the OFF director field state. The director field state at a given applied voltage is defined by the orientation of the liquid crystal director at every point within the liquid crystal layer. This can be conveniently represented by tilt angle and twist angle profiles that show the spatial distribution of the tilt and twist angles from the top to the bottom of the liquid crystal layer. An example of ON and OFF director field states expressed in this manner is given in FIGS. 8A and 8B. Director field states also exist for applied voltages lying between the OFF applied voltage, V0, and the ON applied voltage, V1. These director field states are known as intermediate director field states and would be present in a device for displaying intermediate gray levels. In another preferred embodiment, to achieve faster switching speed, the applied voltage for OFF state may be initially smaller than the optimum V0 before settling to V0 (undershoot), and the applied voltage for ON state maybe initially larger than V1 before settling to V1 (overshoot). This drive technique is well known to those skilled in the art and is of the type described, for example, by R. McCartney in the 2003 Society for Information Display Digest of Technical Papers, pages 1350-53.

DETAILED DESCRIPTION OF PREFERRED EMBODIMENTS

Figure 1A:
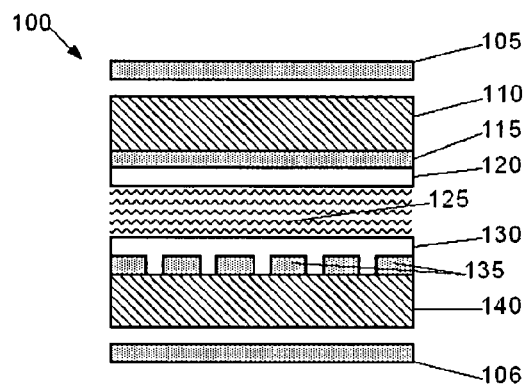
FIGS. 1A, 1B, 1C, and 1D are cross sectional views of four embodiments of liquid crystal devices that are used in, respectively, a transmissive active matrix display, a reflective active matrix display, a transmissive photoactivated display, and a reflective photoactivated display.

FIGS. 1A, 1B, 1C, and 1D illustrate examples of four basic embodiments of liquid crystal devices. FIG. 1A shows a transmissive active matrix liquid crystal device 100 comprising a liquid crystal cell positioned between a first linear polarizer 105 and a second linear polarizer 106. The liquid crystal cell comprises an optically transparent first substrate 110, a first electrode structure 115, a first alignment layer 120, a layer of liquid crystal material 125 the directors of which are oriented in a quasi-homeotropic, self-compensating configuration according to the present disclosure, a second alignment layer 130, a second electrode structure 135, and an optically transparent second substrate 140. Transparent first substrate 110 and transparent second substrate 140 can be made of glass, plastic, or other optically transmissive material. First electrode structure 115 is, for example, a continuous film of indium tin oxide (ITO); and second electrode structure 135 can be individual ITO pixel electrodes, each associated with one or more active elements such as a polysilicon thin film transistor (p-Si TFT). First alignment layer 120 and second alignment layer 130 could be, for example, the SE-1211 alignment polymer conditioned by unidirectionally brushing the polymer surface with a velvet cloth to produce a pretilt angle. Layer of liquid crystal material 125 could be composed of, for example, the commercial liquid crystal mixture Merck MLC-7026-100, which has a negative dielectric anisotropy.

Figure 1B:
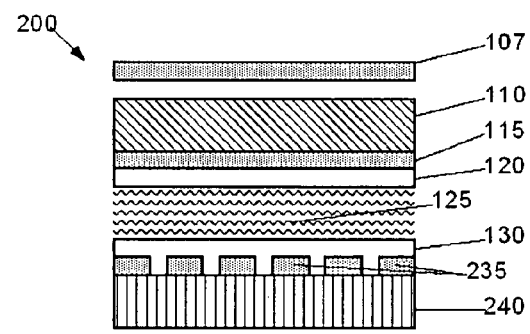

FIG. 1B shows a reflective active matrix liquid crystal device 200 comprising a liquid crystal cell positioned behind a polarizing beamsplitter 107. The liquid crystal cell comprises a transparent first substrate 110, first electrode structure 115, first alignment layer 120, layer of liquid crystal material 125 the directors of which are oriented in a quasi-homeotropic self-compensating configuration according to the present disclosure, second alignment layer 130, an optically reflective second electrode structure 235, and a second substrate 240. Transparent first substrate 110 can be made of glass, plastic, or other optically transmissive material. For a Liquid Crystal on Silicon (LCoS) display, second substrate material 240 is formed from single crystal silicon. First electrode structure 115 is, for example, a continuous film of ITO, and second electrode structure 235 can be individual reflective metallic pixel electrodes, each associated with one or more active elements such as a silicon transistor. First alignment layer 120 and second alignment layer 130 could be, for example, the SE-1211 alignment polymer conditioned by unidirectionally brushing the polymer surface with a velvet cloth to produce a pretilt angle. The layer of liquid crystal material 125 could be composed of, for example, the commercial liquid crystal mixture Merck MLC-7026-100.

Figure 1C:
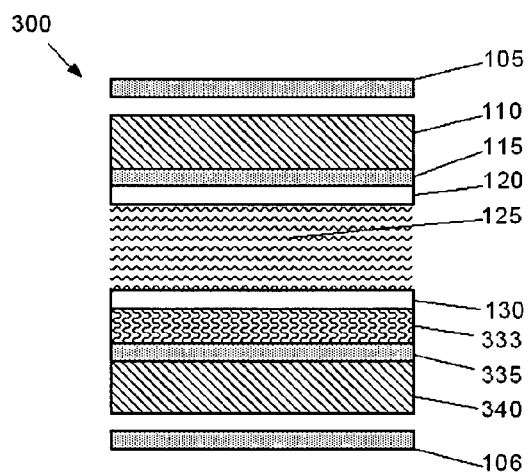

FIG. 1C shows a transmissive photoactivated liquid crystal device 300 comprising a liquid crystal cell positioned between a first linear polarizer 105 and a second linear polarizer 106. The liquid crystal cell comprises a transparent first substrate 110, first electrode structure 115, first alignment layer 120, layer of liquid crystal material 125 the directors of which are oriented in a quasi-homeotropic self-compensating configuration according to the present disclosure, second alignment layer 130, a photoconductive layer 333, a second electrode structure 335, and an optically transparent second substrate 340. Transparent first substrate 110 and transparent second substrate 340 can be made of glass, plastic, or other optically transmissive material. First and second electrode structures 115 and 335 are, for example, continuous films of ITO. Photoconductive layer 333 could be, for example, hydrogenated amorphous silicon-carbide as described in Akiyama et al., *Applied Optics*, Vol. 32, pp. 6493-6500 (1993). First alignment layer 120 and second alignment layer 130 could be, for example, the SE-1211 alignment polymer conditioned by unidirectionally brushing the polymer surface with a velvet cloth to produce a pretilt angle. The layer of liquid crystal material 125 could be composed of, for example, the commercial liquid crystal mixture Merck MLC-7026-100.

Figure 1D:
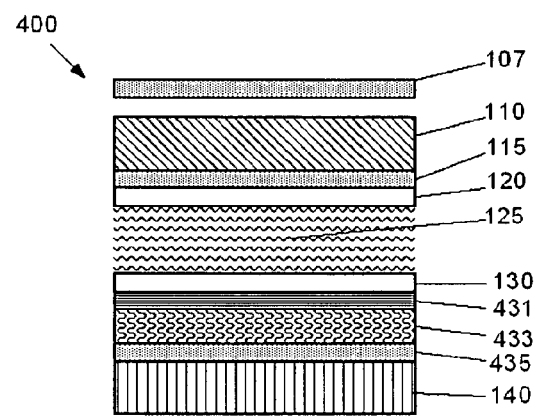

FIG. 1D shows a reflective photoactivated liquid crystal device 400 comprising a liquid crystal cell positioned behind a polarizing beamsplitter 107. The liquid crystal cell comprises a transparent first substrate 110, first electrode structure 115, first alignment layer 120, layer of liquid crystal material 125 the directors of which are oriented in a quasi-homeotropic self-compensating configuration according to the present disclosure, second alignment layer 130, a dielectric mirror 431, a photoconductive layer 433, a second electrode structure 435, and transparent second substrate 140. Transparent first substrate 110 and transparent second substrate 140 can be made of glass, plastic, or other optically transmissive material. First and second electrode structures 115 and 435 are, for example, continuous films of ITO. Dielectric mirror 431 is composed of many layers of transparent materials having alternating high and low indices of refraction. Photoconductive layer 433 could, for example, be CdSe. First alignment layer 120 and second alignment layer 130 could be, for example, the SE-1211 alignment polymer conditioned by unidirectionally brushing the polymer surface with a velvet cloth to produce a pretilt angle. The layer of liquid crystal material 125 could be composed of, for example, the commercial liquid crystal mixture Merck MLC-7026-100.

The elements shown in FIGS. 1A, 1B, 1C, and 1D represent the minimum set needed to explain the principles of operation of the four embodiments. Other elements may be present in the actual displays characterized by these embodiments, but for purposes of clarity, these additional elements have been omitted from FIGS. 1A, 1B, 1C, and 1D. For example, features of the pixel transistors, if any, are not given. Likewise, color filter layers, if any, as well as cell spacer elements and seal elements, are not shown. Added retardation layers, if needed to increase contrast ratio and decrease color shift at oblique light incidence, are also omitted.

Figure 2:
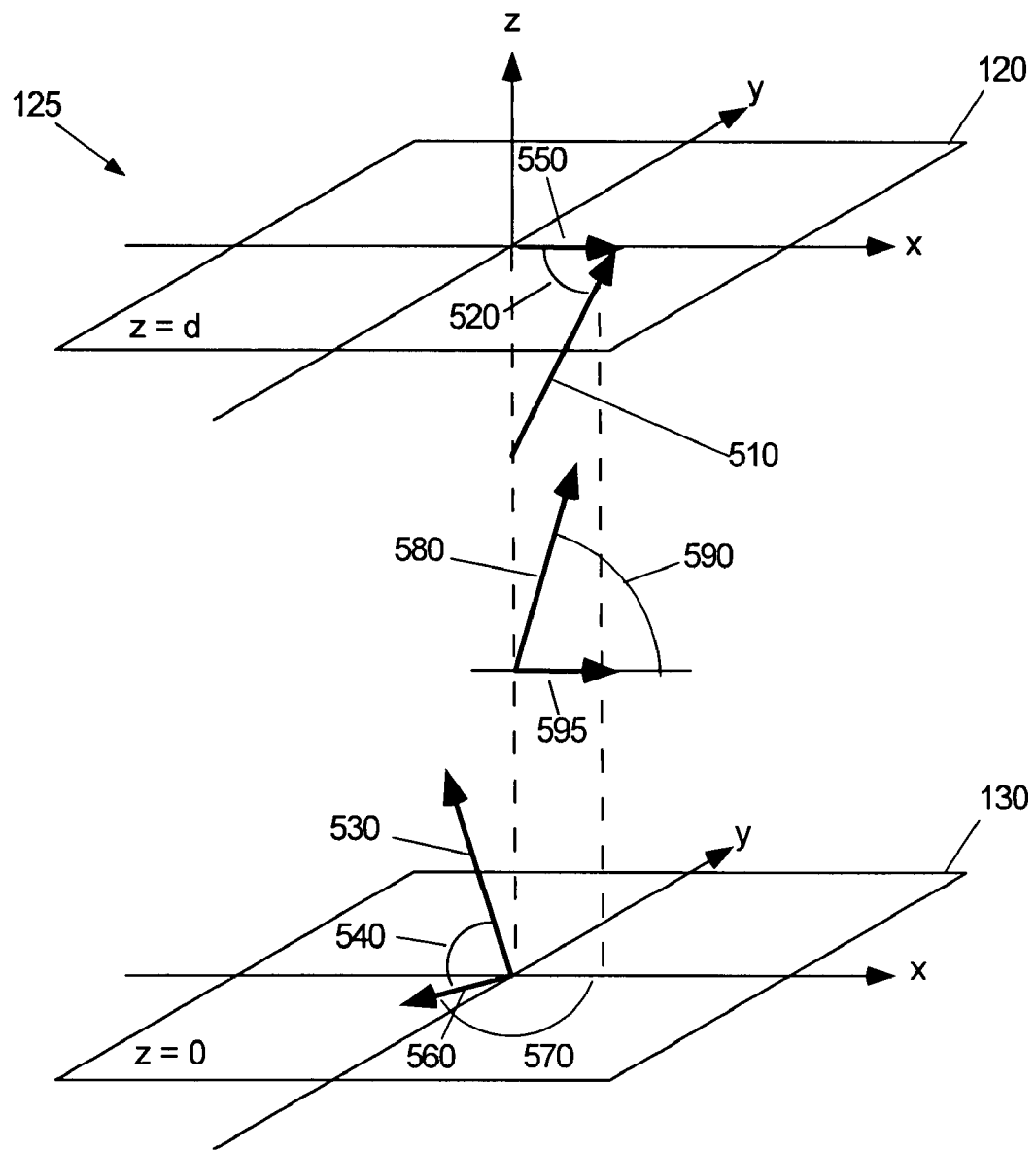
FIG. 2 is a diagram illustrating the directors in the liquid crystal cell of any one of the embodiments shown in FIGS. 1A, 1B, 1C, and 1D.

A more detailed view of the quasi-homeotropic, self-compensating configuration of liquid crystal material 125 is given in FIG. 2. First conditioned alignment layer 120 and second conditioned alignment layer 130 are spaced apart by a cell gap, d, capturing a layer of nematic liquid crystal material having a negative dielectric anisotropy. The nematic liquid crystal material is a uniaxial liquid crystal whose local optic axis is oriented in a direction defined by a vector called the director. An alignment surface contacting director 510 anchored at first conditioned alignment surface 120 makes a pretilt angle 520 with first conditioned alignment surface 120. An alignment surface contacting director 530 anchored at second conditioned alignment surface 130 makes a pretilt angle 540 with second conditioned alignment surface 130. The projection of first alignment surface contacting director 510 onto first conditioned alignment surface 120 defines a first projected alignment direction 550. The projection of second alignment surface contacting director 530 onto second conditioned alignment surface 130 defines a second projected alignment direction 560. There is an offset angle 570 between first and second projected alignment directions 550 and 560. The range of offset angles 570 is between +180° and −180°. A positive offset angle 570 is one in which second projected alignment direction 560 is rotated counterclockwise from first projected alignment direction 550 when viewed downward along the negative z-axis, and a negative offset angle 570 is one in which second projected alignment direction 560 is rotated clockwise from first projected alignment direction 550 when viewed downward along the negative z-axis. A surface noncontacting director 580 makes a tilt angle 590 relative to alignment layer surfaces 120 and 130. A projection of surface noncontacting director 580 onto a plane parallel to alignment layer surfaces 120 and 130 defines a surface noncontacting projected alignment direction 595. Surface noncontacting projected alignment direction 595 depends upon the location along the z-axis between first conditioned alignment layer surface 120 (z=d) and second conditioned alignment layer surface 130 (z=0). The twist angle $\phi$ of the cell is defined by the total angle of rotation that surface noncontacting projected alignment direction 595 undergoes along the distance from z=0 to z=d. For the embodiments described, the cell twist angle $\phi$ is equal to offset angle 570, with a positive offset angle 570 producing a right-handed cell twist angle and a negative offset angle 570 producing a left-handed cell twist angle.

The simulations used to support descriptions of preferred embodiments disclosed assume strong azimuthal boundary coupling, which means that the first and second projected alignment directions 550 and 560 are fixed at the time the surfaces are conditioned, e.g., by the brushing direction of the alignment polymer or the azimuthal direction of the oblique vacuum deposition of alignment material. However, the self-compensation principles of the present invention are equally applicable for cases in which the azimuthal boundary coupling is not strong. For these cases, the projected alignment directions 550 and 560 are influenced by the torques applied by the twisted liquid crystal layer itself, the intrinsic twist, and the electric field. These effects are taken into account when determining the self-compensating cell twist angle.

The liquid crystal material itself can have an intrinsic twist that can be characterized by a thickness-to-pitch ratio, d/p, where "d" is the cell gap and "p" is the intrinsic pitch of the liquid crystal material. The intrinsic pitch, p, is the distance measured in a direction perpendicular to the liquid crystal director from beginning to end of a full 360° rotation of the director when no external boundary conditions are imposed. An intrinsic twist can be imparted to the nematic liquid crystal material by dissolving a small quantity of optically active material, known as a chiral dopant, into the liquid crystal material. Chiral dopants, available from Merck expressly for this purpose, include R-2011 that imparts a right-handed intrinsic twist to the liquid crystal and S-2011 that imparts a left-handed intrinsic twist to the liquid crystal. The pitch is inversely proportional to the concentration of the chiral dopant and so can be easily modified.

The following examples of preferred embodiments of liquid crystal devices represent simulations using the commercial LCD modeling software available from Shintech, Ltd., Japan and from Autronic-Melchers GmbH, Germany. The simulations use the material constants of Merck MLC-7026-100 liquid crystal material, which are given in Table 1, and the wavelength of light is taken to be 550 nm for the incident polarized light, which is near the center of the visible spectrum where the human eye is most sensitive.

TABLE 1

Material properties of Merck MLC-7026-100

| name of material constant | symbol | value |
| --- | --- | --- |
| ordinary refractive index | $n_o$ | 1.4833 |
| extraordinary refractive index | $n_e$ | 1.5924 |
| parallel dielectric constant | $\epsilon_\parallel$ | 3.7 |
| perpendicular dielectric constant | $\epsilon_\perp$ | 7.6 |
| dielectric anisotropy | $\Delta\epsilon$ | −3.9 |
| splay elastic constant | $k_{11}$ | 17.1 pN |
| twist elastic constant | $k_{22}$ | 10.3 pN |
| bend elastic constant | $k_{33}$ | 15.3 pN |

For the simulations presented below, the optical output of the display device is expressed in terms of optical efficiency, which, for the case of ideal optical components, is the same as the transmittance of polarized light with a crossed analyzer for a transmissive mode device or the reflectance of polarized light with a crossed analyzer (equivalent to a polarizing beamsplitter) for reflective mode device. Ideal optical components means no scattering, diffraction, or absorption in the layers making up display device and an analyzer that is fully transmissive for one polarization component and fully blocking for the other. For a display device with actual optical components, 100% optical efficiency means that the display liquid crystal cell rotates the direction of polarized light by 90° to coincide with the pass direction of the analyzer, and 0% optical efficiency means that the direction of polarized light leaves the display liquid crystal cell unchanged and the polarized light is thereafter blocked by the analyzer. For a thinner self-compensating cell with less than 100% efficiency, the light reaching the analyzer is generally not linearly polarized but rather elliptically polarized, causing some amount of light to be blocked by the analyzer.

The simulation procedure carried out to obtain the optimum self-compensation conditions and thus a 100% efficient ON director field state and a 0% efficient OFF director field state is a two-step process. First, for a given cell twist angle, the values of the cell gap and input polarizer angle that provide 100% optical efficiency are determined under the ON state driving voltage, for example 5 volts. The OFF director field state under these conditions is then simulated, and the dark state optical efficiency is determined. This entire process is repeated for other cell twist angles, until one of them is found that achieves near zero optical efficiency, i.e., self-compensation, at the desired subthreshold drive voltage and hence the highest contrast ratio.

Example 1

Figure 3:
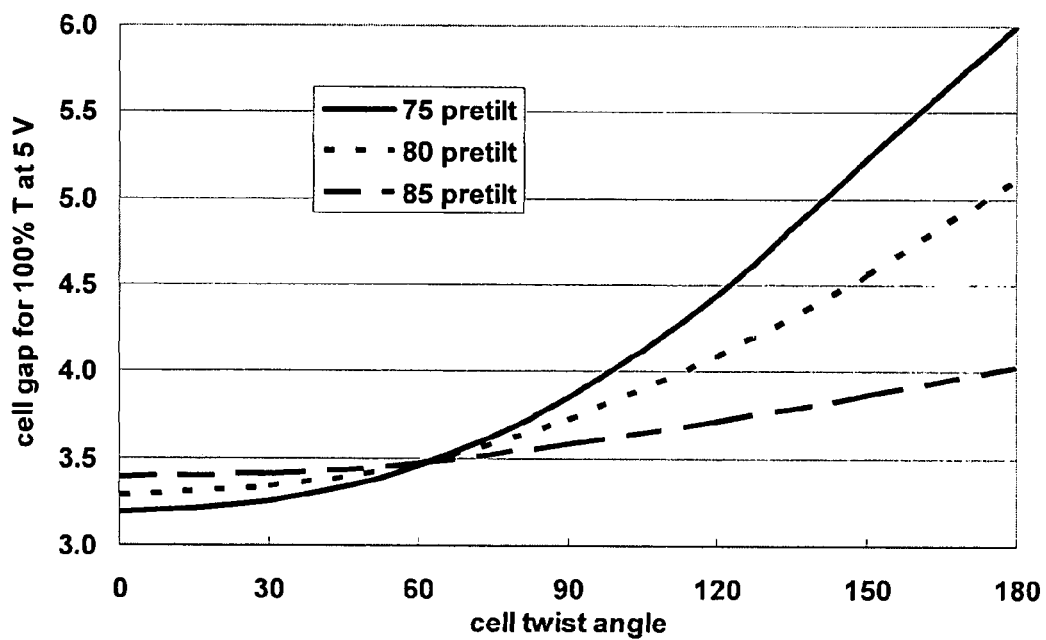
FIG. 3 presents, for an example of the preferred embodiments, graphs showing cell gap as a function of cell twist angle required for each of three different pretilt angles to achieve 100% optical efficiency at a 5 volt ON director field state drive voltage.

This two-step process is described in more detail in Example 1 for the case of the transmissive embodiments illustrated in FIGS. 1A and 1C. For Example 1, there is no chiral dopant present and the pretilt angles on the two substrate surfaces are equal. In the first step, an ON director field state drive voltage V1 of 5 volts is applied across the liquid crystal layer. For this case of a transmissive cell with equal pretilt angles at both substrate surfaces, a condition to obtain 100% optical efficiency is the input polarization direction of the light making either a +45° angle or a −45° angle with respect to the bisector of the first and second projected alignment directions. The polarization direction of an analyzer is crossed with that of the polarizer. In the first step, a cell twist angle is chosen and the cell gap is adjusted until the optical efficiency of the cell reaches 100%, indicating 90° polarization rotation because the analyzer is crossed with the polarizer. This procedure is repeated for a series of cell twist angles ranging from 0° to 180°. The results are given in FIG. 3, which shows the minimum cell gap, d, required to achieve 100% optical efficiency at V1 of 5 volts for each of the three different pretilt angles of 75°, 80°, and 85° that were considered.

In the second step, an OFF director field state subthreshold bias voltage V0 is chosen and the transmission of polarized light is simulated over a range of cell twist angles using the appropriate cell gap determined from the first step. The contrast ratio is defined as the ON director field state optical efficiency, which is 100%, divided by the OFF director field state optical efficiency. The twist angle at which the contrast ratio achieves a cusp-like peak is called the self-compensating twist angle.

Figure 4A:
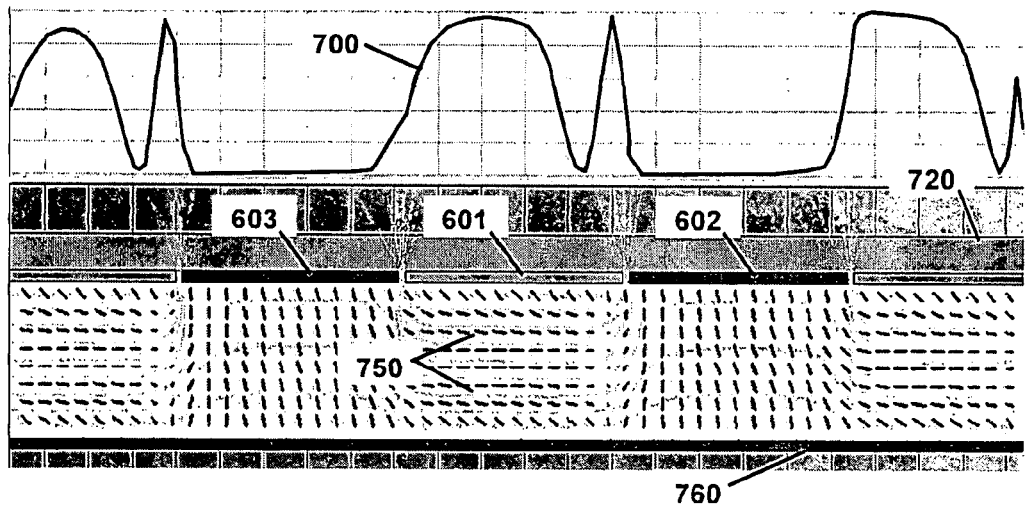
FIGS. 4A, 4B, 4C, and 4D present, for an example of the preferred embodiments, the suppression of disclination lines resulting from fringe field effects by reducing the pretilt angle, and the effect of such reduction on the transmission of light through ON state and OFF state pixels.
Figure 4B:
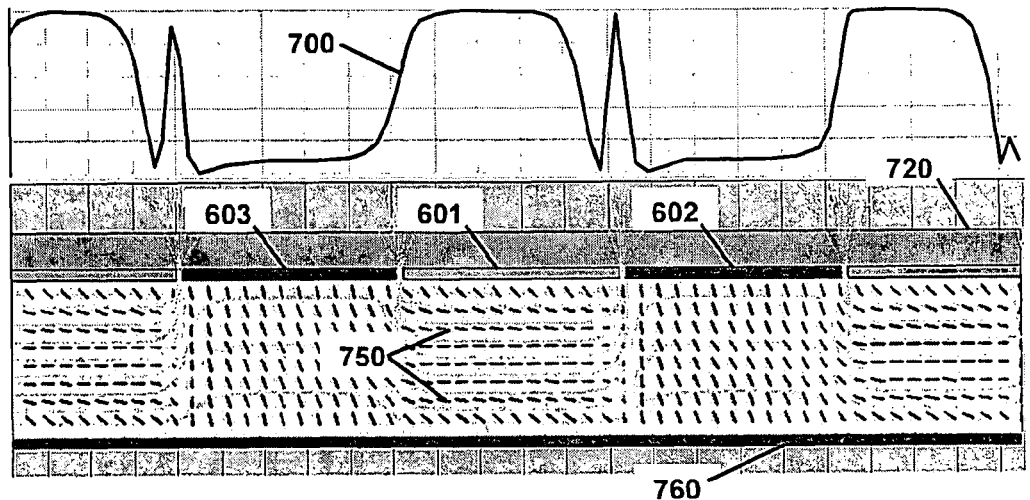
Figure 4C:
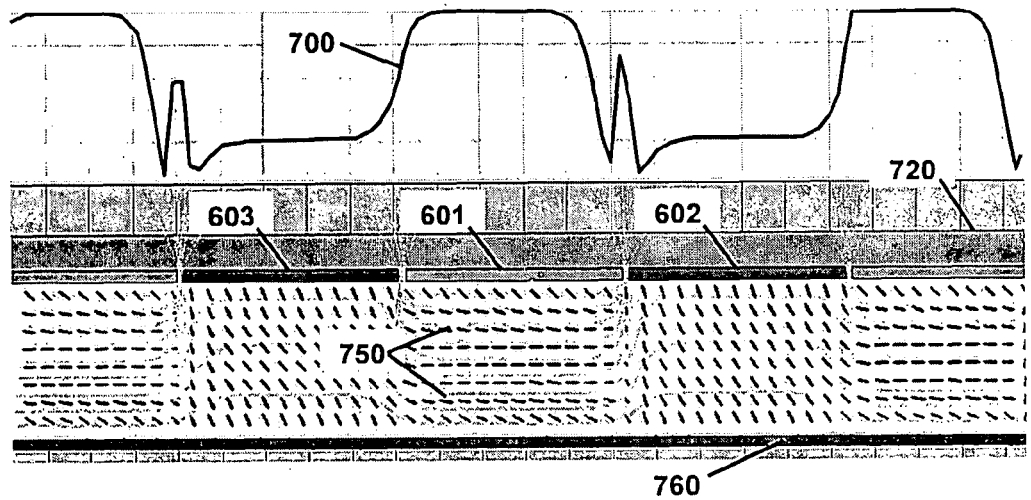
Figure 4D:
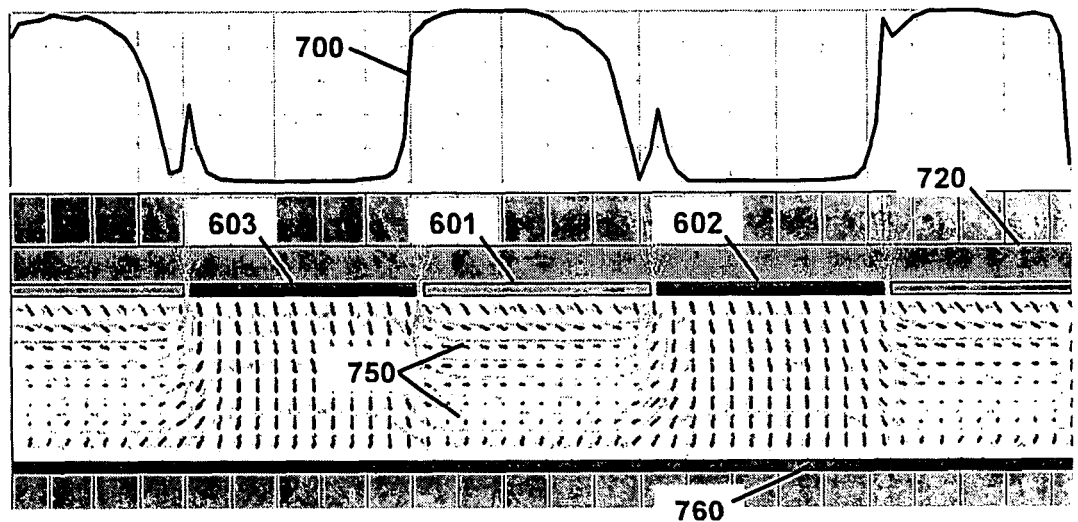

The choice of pretilt angle of the quasi-homeotropic liquid crystal device in the preferred embodiments is characterized by the suppression of the disclination lines in a pixilated display device while maintaining the self-compensation conditions, A two-dimensional numerical simulation program is used to simulate the liquid crystal director configuration as well as the optical throughput as a function of location on the display under the condition of alternating ON and OFF pixels, as shown in FIGS. 4A, 4B, 4C and 4D. The device in the examples is composed of a reflector 720, a layer 750 of liquid crystal material MLC-7026-100 sandwiched between pixilated upper electrodes 601, 602, and 603 and a bottom lower electrode 760. Simulation results are given in FIGS. 4A, 4B, and 4C under the conditions of zero twist angle and pretilt angles of 85°, 80°, and 75°, respectively. The pixel size shown in the examples are 10 µm with a pixel gap of 0.25 µm and a cell gap of 1.3 µm. (Pixel gap is the distance separating next adjacent pixilated upper electrodes.) The voltage at upper electrode 601 is held at 3.3V, surrounded by two upper electrodes 602 and 603 both held at 0V. The upper electrodes next to upper electrodes 602 and 603 are again held at 3.3V to form an alternating ON and OFF pattern. The common, lower electrode 760 is held at −1.7V. The steady state director structure of liquid crystal layer 750 is shown by an array of line segments. An optical throughput curve 700, calculated using a central wavelength of 550 nm as a function of location in the display including pixels defined by upper electrodes 601, 602, and 603 is shown at the top of each of these figures. Optical throughput curve 700 in FIG. 4A across upper electrode 601 in the example shows a rounded, less than optimal 50% throughput at most locations across the electrode. Curve 700 also shows a minimum towards the pixel gap next to electrode 602 and then a narrow peak, indicating a disclination line near the pixel gap due to fringe field effects. This rounding off becomes less, the second, narrow throughput peak becomes smaller, and the throughput dip moves closer to the pixel gap for the smaller 80° and 75° pretilt cases shown in FIGS. 4B and 4C, resulting in an ON state pixel that is brighter and free from dark defects, However, as the pretilt angle becomes smaller as shown in FIG. 4B and even smaller as shown in FIG. 4C, the light leakage in the dark, OFF state pixels defined by electrodes 602 and 603 becomes significantly greater, and in the case of the 75° pretilt case shown in FIG. 4C, the contrast ratio is reduced to approximately 5:1.

The reduction of light leakage in the OFF state pixels at smaller pretilt angles can be achieved according to the preferred embodiments by introducing a twisted director structure liquid crystal layer 750. In the example shown in FIG. 4D, the device has the same structure as that shown in FIG. 4C, i.e., the pretilt angle is 75°, except that the azimuthal angle of the liquid crystal molecules at a lower boundary 760 makes an angle of 145° relative to the azimuthal angle at the upper boundary. In the simulation for FIG. 4D, the wavelength of light is 395 nm and the polarizers are crossed but with the input polarizer transmission axis oriented to make an angle of 15° relative to the liquid crystal director at the upper boundary. These conditions provide self-compensation for the OFF state, where it is seen from curve 700 of FIG. 4D that the optical throughput of the dark pixels defined by electrodes 602 and 603 has been reduced to near zero, while at the same time the optical throughput of the ON pixel defined by electrode 601 is nearly saturated and shows no dip in ON state pixel area and a very small secondary peak over the pixel gap.

Figure 5:
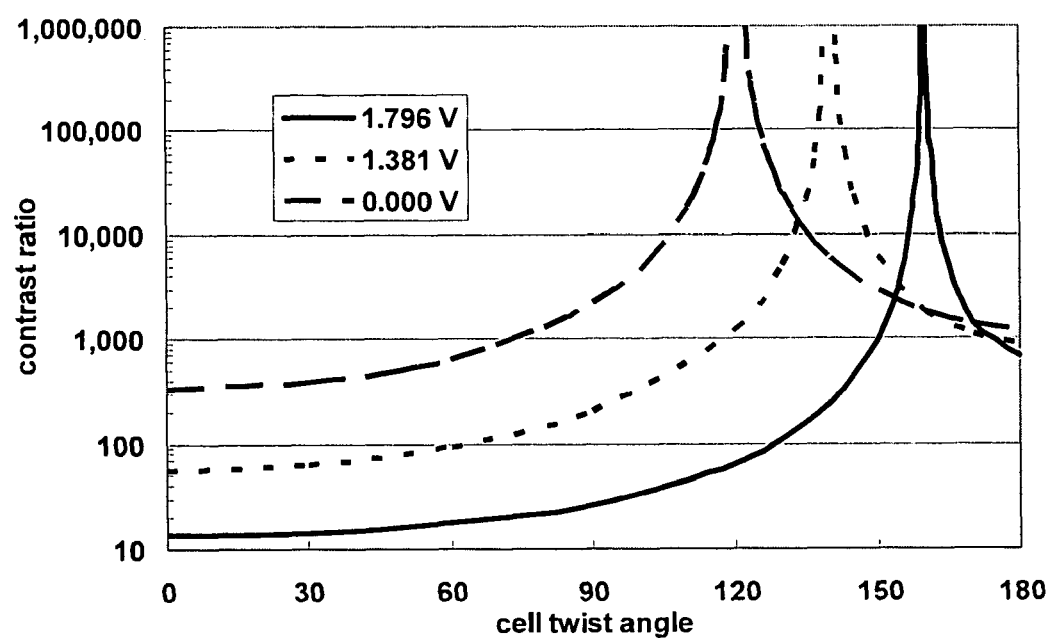
FIG. 5 presents, for an example of the preferred embodiments in the case of an 80° pretilt angle, graphs showing contrast ratio as a function of cell twist angle for three different subthreshold drive voltages.

The self-compensating condition is characterized by the cuspate singularity in the contrast ratio vs. cell twist angle curves where the contrast ratio can exceed 1,000,000. At the self-compensation cell twist angle, the liquid crystal material constants, subthreshold drive voltage, intrinsic twist property, pretilt angles, and cell gap all cooperate to provide a director distribution within the liquid crystal layer that has nearly zero in-plane retardation. FIG. 5 shows that, for the case of 0° twist angle, the contrast ratios are quite low with 324, 56, and 13 at the respective subthreshold voltages of 0, 1.381, and 1.796 volts. However, by selecting self-compensating cell twist angles of 120°, 140°, and 160° at the respective subthreshold voltages of 0, 1.381, and 1.796 volts, the contrast ratio can be increased to over 1,000,000 in each case without sacrificing the ON director field state brightness.

Figure 6:
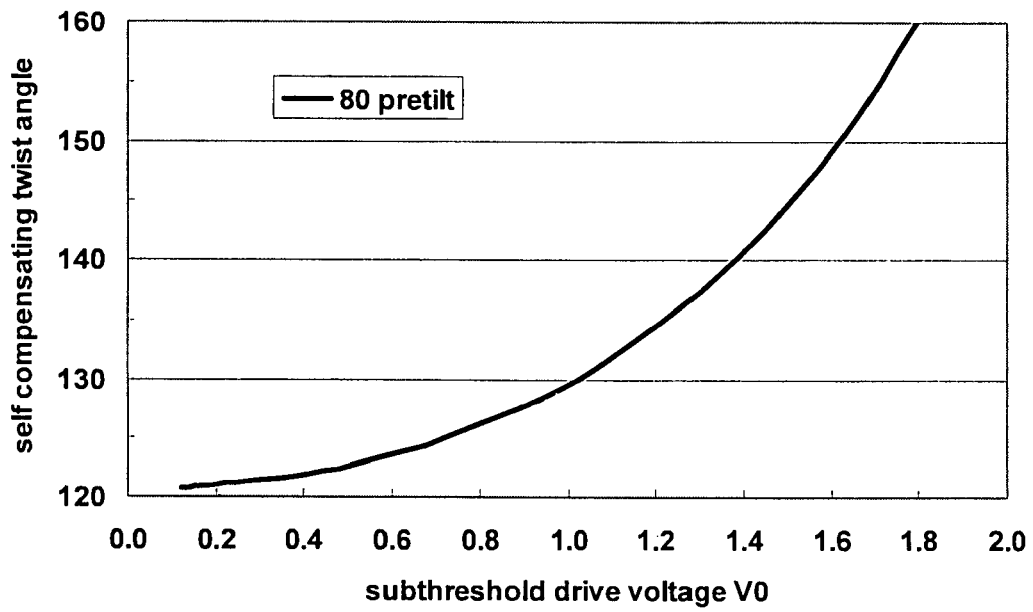
FIG. 6 presents, for an example of the preferred embodiments in the case of an 80° pretilt angle, a graph showing self-compensating cell twist angle as a function of subthreshold drive voltage.

FIG. 6 shows the relationship between the self-compensating cell twist angle and the subthreshold drive voltage for the case of 80° pretilt angles on the two substrate surfaces. This curve is useful for determining the appropriate self-compensating cell twist angle based on the available range of drive voltages. For example, if the ON director field state drive voltage V1 is 5 volts and the dynamic range of the display driver is 4 volts, then the OFF director field state, subthreshold drive voltage will be 1 volt. The curve shown in FIG. 6 indicates that the cell twist angle to achieve self-compensation at 1 volt is 130°.

Figure 7A:
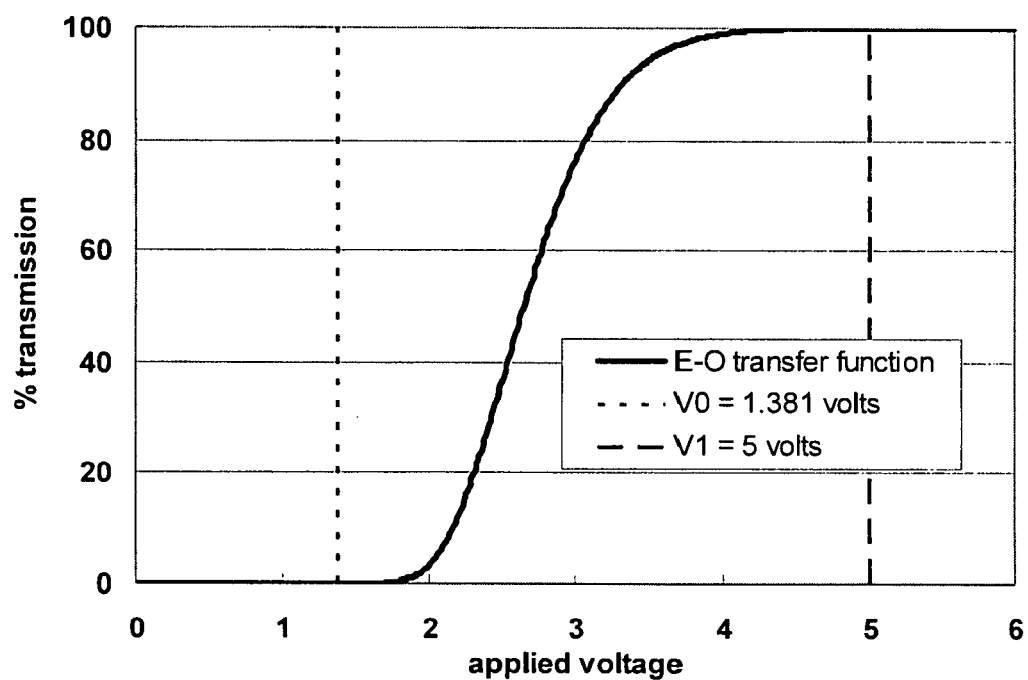
FIGS. 7A and 7B present, for an example of the preferred embodiments, graphs that show on, respectively, a linear scale and a logarithmic scale the electro-optical transfer function in the case of a pretilt angle of 80° and a cell twist angle of 140°.
Figure 7B:
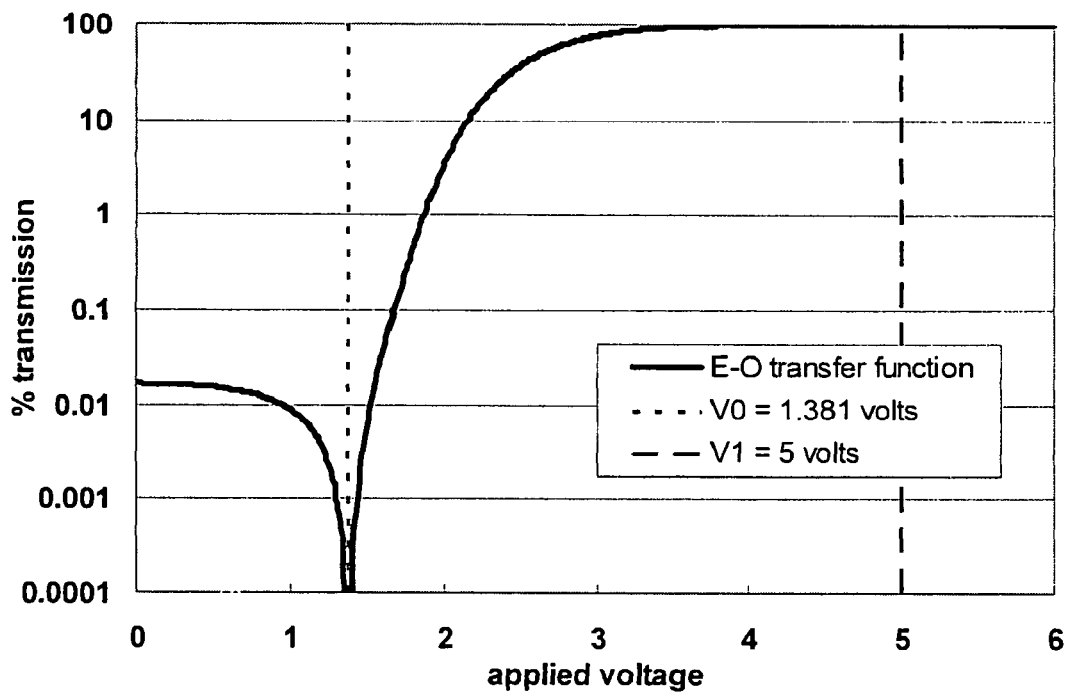

FIGS. 7A and 7B show the electro-optic transfer function for the case of 80° pretilt angles on both surfaces, a 140° twist angle and a 1.381 volt subthreshold drive voltage. The linear scale of FIG. 7A demonstrates the capability of this configuration to provide gray scale, and the vertical lines at 1.381 volts and 5 volts indicate the applied voltages associated with, respectively, the OFF and ON director field states. The large dip in the inverted cusp seen on the logarithmic scale of FIG. 7B demonstrates that the configuration is self-compensating at the 1.381 volt subthreshold drive voltage.

Figure 8A:
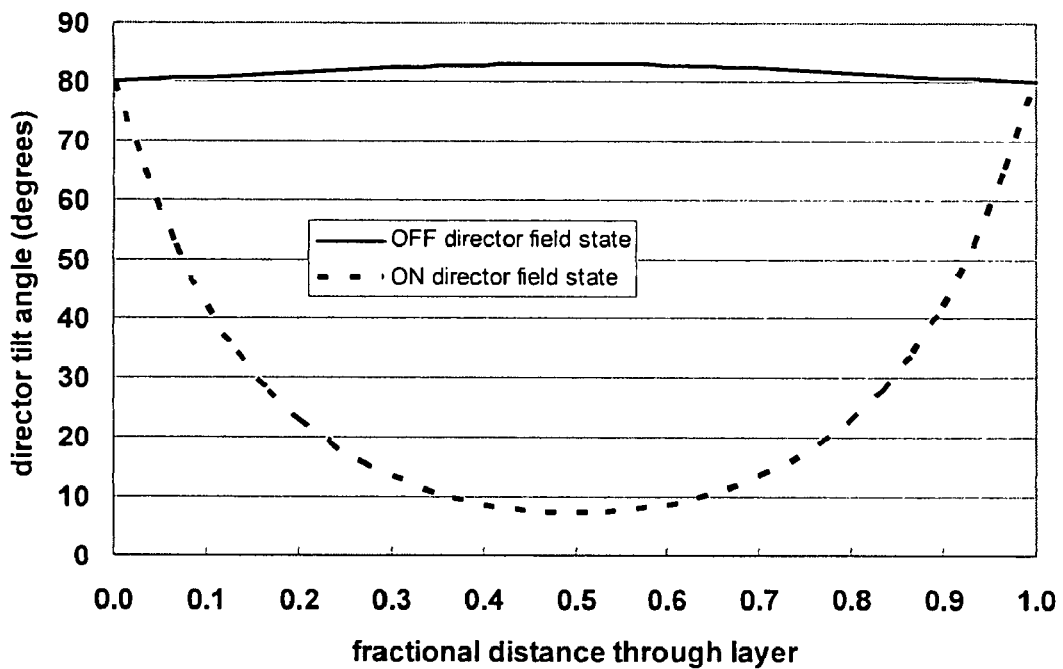
FIGS. 8A and 8B present, for an example of the preferred embodiments, graphs of OFF and ON director field states in terms of, respectively, a tilt profile and a twist profile.
Figure 8B:
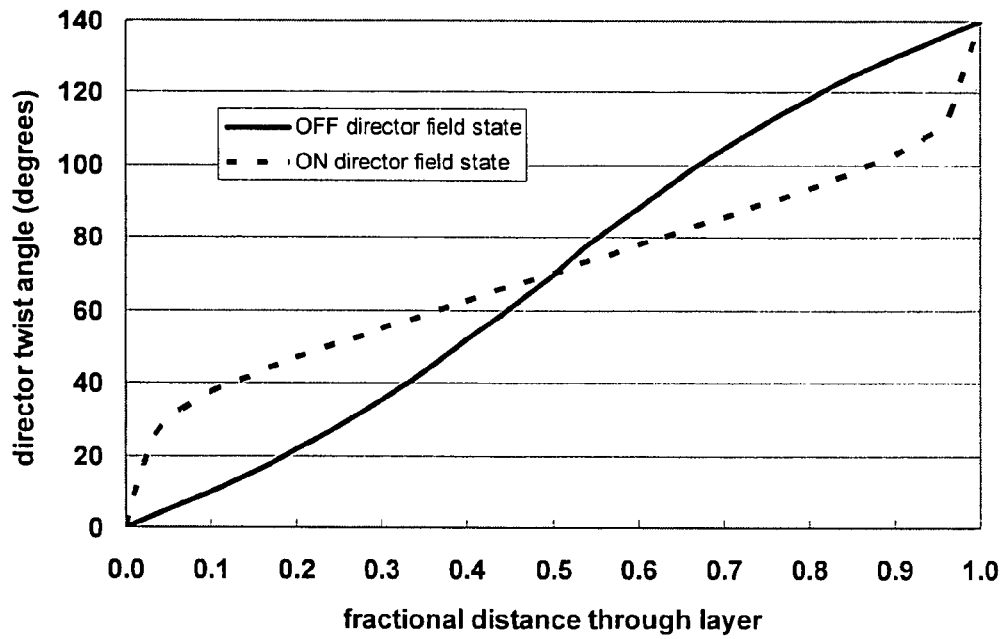

The ON and OFF director field states for the case given in FIGS. 7A and 7B are shown in FIGS. 8A and 8B in the form of a tilt profile (FIG. 8A) and twist profile (FIG. 8B) that describe the orientation of the liquid crystal director at all locations between first alignment layer surface 120 and second alignment layer surface 130. FIG. 8A indicates that, in the OFF director field state, the tilt angle 590 of the surface noncontacting director 580 located midway between the first and second conditioned alignment layers is 83°, which is larger than the 80° surface pretilt angles 520 and 540.

Figure 9:
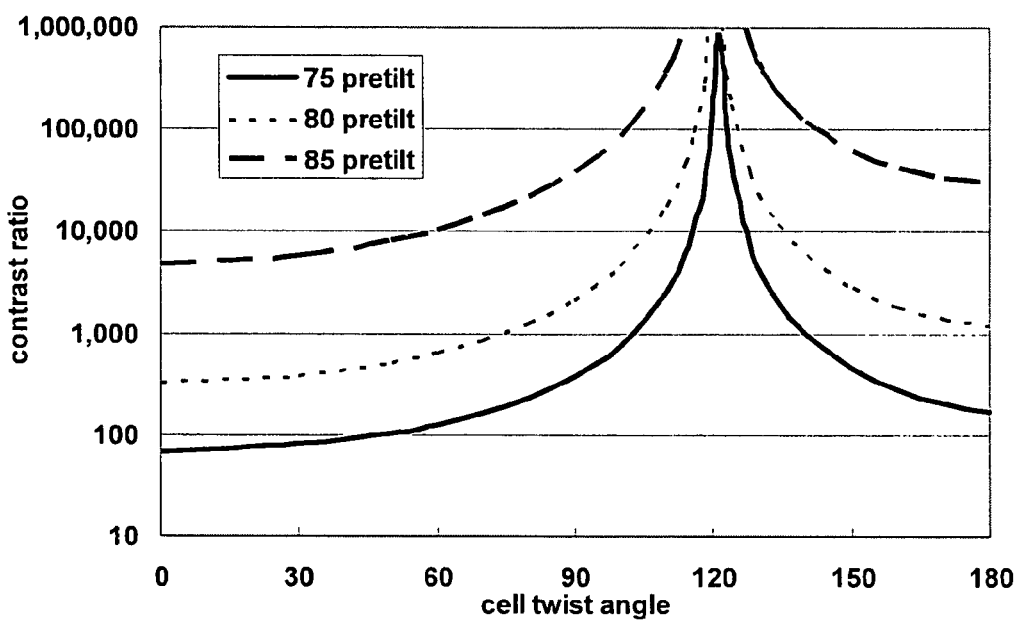
FIG. 9 presents, for an example of the preferred embodiments in the case of zero subthreshold voltage, graphs showing contrast ratio as a function of cell twist angle for three different pretilt angles.
Figure 10:
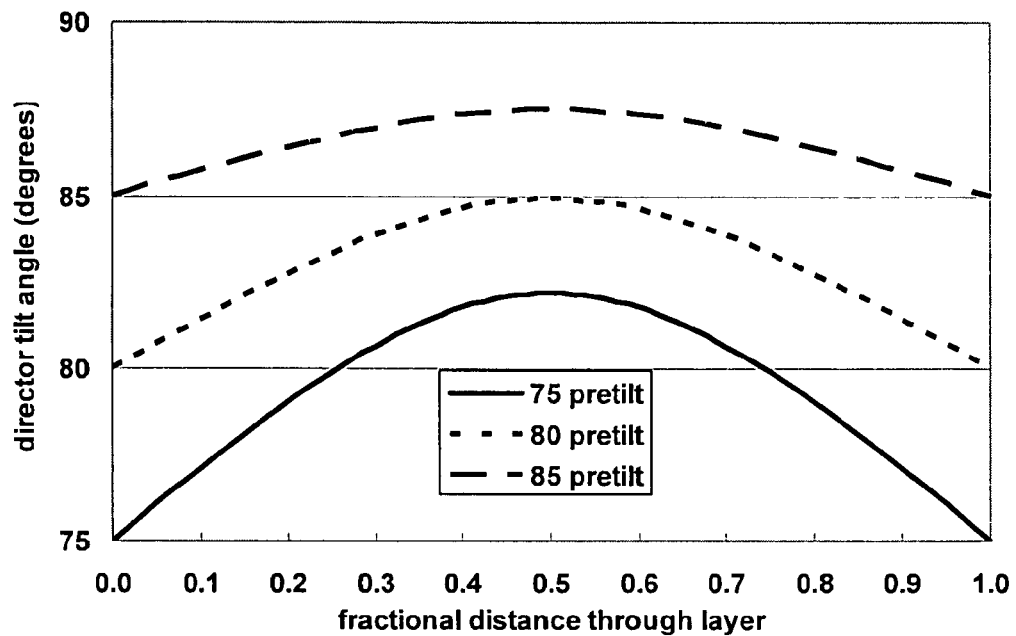
FIG. 10 presents, for an example of the preferred embodiments in the case of zero subthreshold voltage, graphs showing the distribution of the liquid crystal director tilt angle throughout the cell, commonly called the tilt profile, for each of pretilt angles of 75°, 80°, and 85°.

In FIG. 9 the contrast ratio is simulated as a function of the cell twist angle. The three curves correspond to the cases where the equal pretilt angles on the two substrate surfaces are 75°, 80°, and 85° and the subthreshold voltage V0 is zero. Each curve exhibits a characteristic cuspate singularity indicating self-compensation in the vicinity of a cell twist angle of 120°. FIG. 10 shows the tilt angle profiles for these three cases at their self-compensation cell twist angles of 120°. For the three different pretilt angles of 75°, 80°, and 85°, the tilt angle of the liquid crystal director in the middle of the layer is, respectively, 82.2°, 84.9°, and 87.5°, i.e. the tilt angle of the liquid crystal director in the middle of the layer is approximately the average value of the surface pretilt angle and 90°.

Example 2

Figure 11:
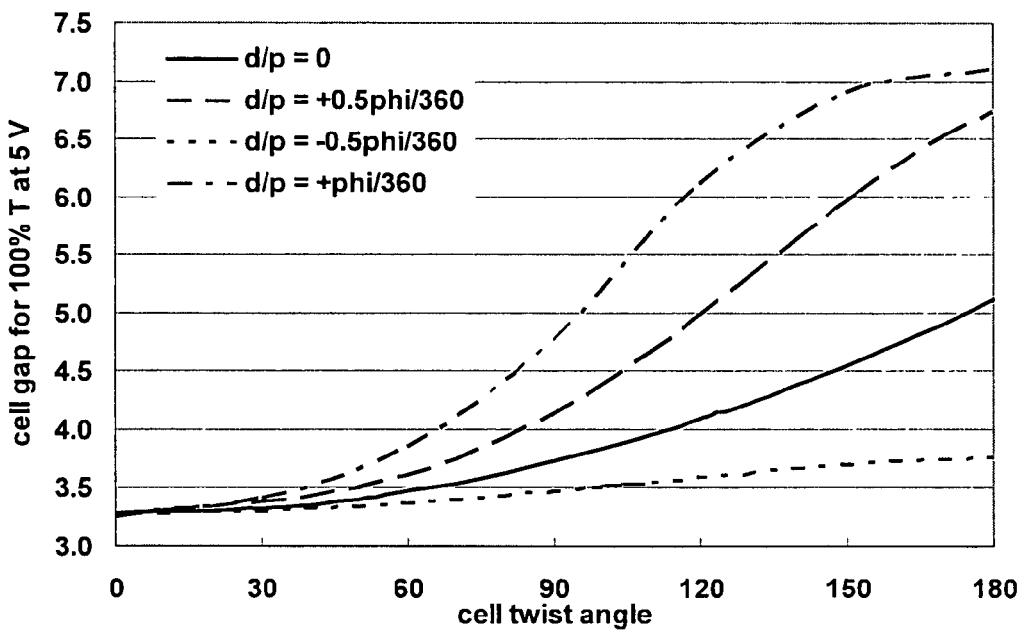
FIG. 11 presents, for an example of the preferred embodiments in which the pretilt angle is 80° on both substrates, graphs showing the cell gap required for the liquid crystal configuration to achieve 100% optical efficiency at a 5 volt ON director field state drive voltage as a function of the cell twist angle for four different amounts of intrinsic twist in the liquid crystal material.

The following Example 2 relates to preferred embodiments in which the liquid crystal material has an intrinsic twist. As in the previous Example 1, determining the self-compensating twist angle is a two-step process. The following simulations use an 80° pretilt angle. The simulation results of the first step are given in FIG. 11, which shows the cell gap, d, for 100% optical efficiency at 5 volts vs. cell twist angle for a family of curves with differing amounts of intrinsic twist, including zero. The curve designated d/p=0, included for comparison purposes, represents the case in which there is no intrinsic twist and is the same curve as that shown in FIG. 3 for the case of an 80° pretilt angle. The curve designated d/p=+φ/360 represents the amount of intrinsic twist that is commonly used in prior art chiral homeotropic display cells. For a 90° cell twist angle, for example, d/p=¼; and for a 120° cell twist angle, d/p=⅓. In the absence of azimuthal boundary forces when d/p=φ/360, the cell will have the desired twist angle when a voltage is applied to substantially tilt the liquid crystal director throughout the liquid crystal layer. The positive sign for the intrinsic twist indicates that the intrinsic twist has the same rotational sense as that of the cell twist. The d/p=+φ/360 curve in FIG. 11 shows that the required cell gap to achieve 100% optical efficiency is considerably larger than that required for a cell without an intrinsic pitch, and this can dramatically increase the switching time of the cell. The required cell gap is correspondingly less for the curve designated d/p=+0.5φ/360, but the cell gap is still larger than that in the case with no intrinsic twist. The curve designated d/p=−0.5φ/360 corresponds to the case in which the intrinsic twist has the opposite rotational sense compared with that of the cell twist. For this case, the cell gap required to achieve 100% optical efficiency can be significantly less than that required in the case in which there is no intrinsic twist.

Figure 12:
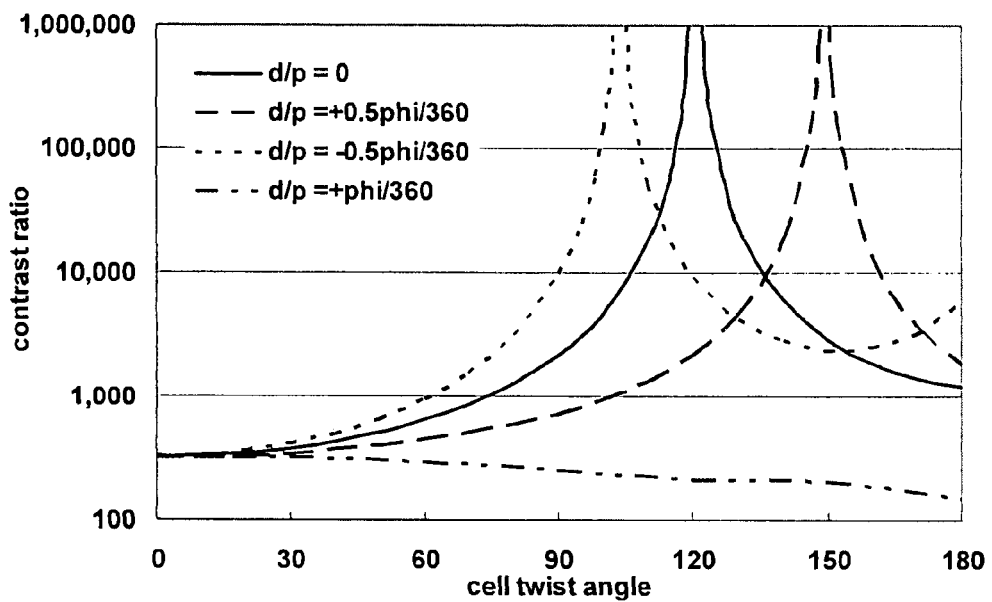
FIG. 12 presents, for an example of the preferred embodiments in which the subthreshold voltage is zero and the pretilt angle is 80° on both substrates, graphs showing contrast ratio as a function of cell twist angle for four different amounts of intrinsic twist in the liquid crystal material.

The simulation results for the second step of Example 2 are given in FIG. 12 for the case in which the subthreshold voltage is zero. Again, for comparison purposes, the curve designated d/p=0 is the same curve as that shown in FIG. 5 when V0=0. FIG. 12 indicates that there is no self-compensation for the case with d/p=+φ/360 and, in fact, the contrast ratio worsens with increasing cell twist angle. For this case, the tilt angle in the middle of the layer is always less than the pretilt angle, regardless of the cell twist angle. But for lesser amounts of intrinsic twist, for example, ±0.5φ/360, self-compensation does occur as evidenced by the cusps in the contrast curves of FIG. 12 at twist angles of 149° for d/p=+0.5φ/360 and 104° when the intrinsic twist is of opposite rotational sense to that of the cell twist with d/p=−0.5φ/360. For both of these cases, the director tilt angle in the middle of the liquid crystal layer is greater than the 80° pretilt angle, with 86.3° at the self-compensating cell twist angle of 104° for d/p=−0.5φ/360 and 82.7° at the self-compensating cell twist angle of 149° for d/p=+0.5φ/360.

Figure 13:
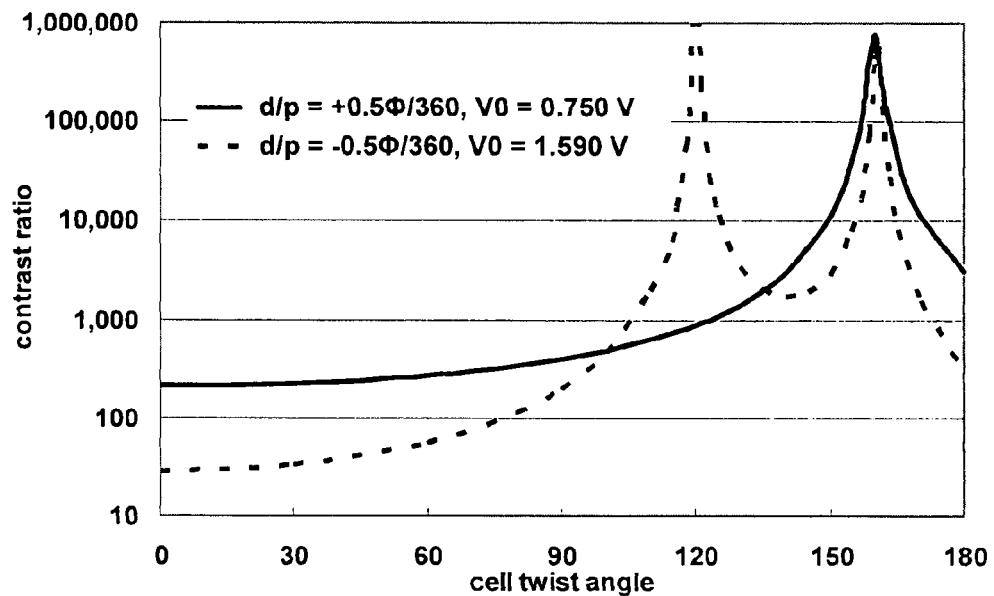
FIG. 13 presents, for an example of the preferred embodiments in which the pretilt angle is 80° on both substrates, two graphs showing contrast ratio as a function of cell twist angle for the case of two different amounts of intrinsic twist in the liquid crystal material and their respective subthreshold voltages.

FIG. 13 shows the contrast ratio as a function of cell twist angle for simulations having intrinsic twist and non-zero subthreshold voltages. One simulation with d/p=+0.5φ/360 and V0=0.750 volt has a cusp in the contrast curve occurring at a cell twist angle of 160°, indicating self-compensation at that angle. For the other simulation with d/p=−0.5φ/360 and V0=1.590 volts, the contrast curve has two cusps indicating self-compensation at the cell twist angles of 120° and 161°.

Example 3

Figure 14:
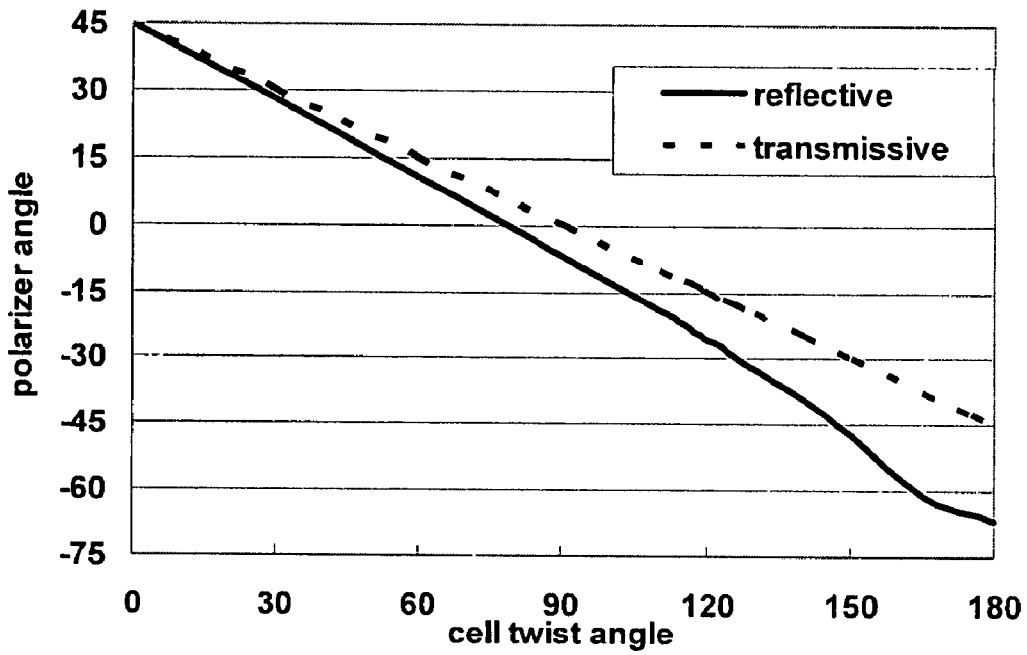
FIG. 14 presents, for an example of the preferred embodiments, graphs comparing as a function of cell twist angle the polarizer orientation angle set to obtain 100% optical efficiency at 5 volts in a reflective display with the corresponding polarizer orientation angle of a transmissive display.

The following Example 3 relates to the reflective embodiments illustrated in FIGS. 1B and 1D. In these embodiments, it is common to use a polarizing beamsplitter as the crossed polarizer/analyzer combination, but other polarizer arrangements are also possible such as a single polarizer or an off-axis combination of a polarizer and analyzer. The simulations shown in this example use a polarizing beamsplitter at the input to the liquid crystal device. The simulations proceed along a fashion similar to that described earlier for the transmissive devices in Examples 1 and 2, except that the input polarization direction of the incident light to achieve 100% optical efficiency no longer makes a +45° or a −45° angle with the bisector of the first and second projected alignment directions but becomes a free parameter to be adjusted along with the cell gap to achieve 100% optical efficiency. FIG. 14 compares the polarizer orientation angle required to obtain 100% optical efficiency at 5 volts using the Merck MLC-7026-100 liquid crystal material with 80° pretilt angles on both substrates and no intrinsic twist with the transmissive case under similar conditions. Significant deviations between polarizer angles occur, especially at higher twist angles.

Figure 15:
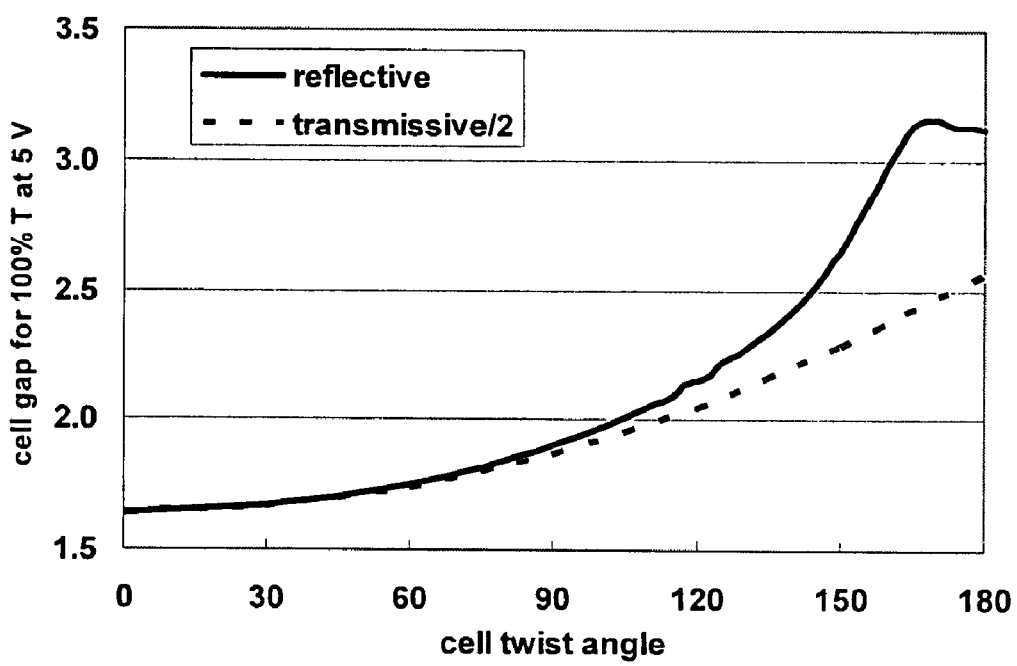
FIG. 15 presents, for an example of the preferred embodiments, graphs comparing as a function of cell twist angle the cell gap required for a reflective liquid crystal device to achieve 100% optical efficiency at a 5 volt ON director field state drive voltage with one-half of the cell gap required for a transmissive liquid crystal device to achieve 100% optical efficiency at a 5 volt ON director field state drive voltage.

FIG. 15 shows the cell gap, d, which, together with the polarizer angle shown in FIG. 14, results in 100% optical efficiency at 5 volts. Comparison with the transmissive case of FIG. 3 for 80° pretilt shows that the cell gap is approximately one-half the cell gap for the transmissive case for smaller twist angles, but becomes significantly greater for larger twist angles.

Figure 16:
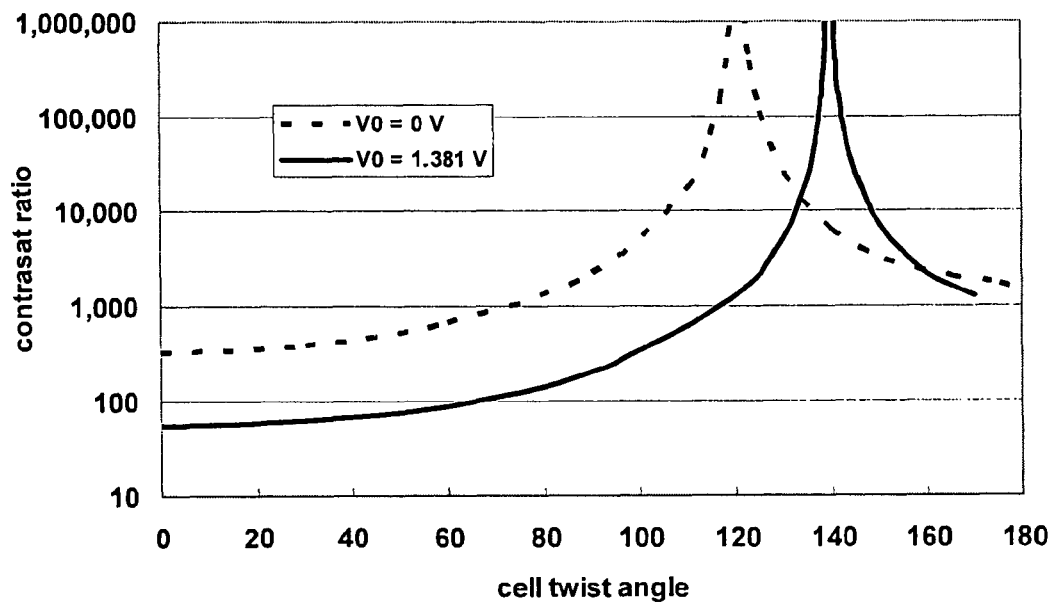
FIG. 16 presents, for an example of a reflective device of the preferred embodiments in the case of an 80° pretilt angle, graphs showing contrast ratio as a function of cell twist angle for the subthreshold drive voltages V0=0 V and V0=1.381 V.

FIG. 16 shows a family of contrast ratio vs. cell twist angle curves for this reflective case when the subthreshold voltage is 0 V and 1.381 V. The behavior of these two curves is very similar to that of their transmissive counterparts of FIG. 5, where self-compensation also occurs at cell twist angles of 120° and 140° for the subthreshold voltages of 0 V and 1.381 V.

Practical projectors operate with wide angle illumination and use collection optics to achieve acceptable light output. Because of the self-compensating feature, liquid crystal-based projectors with imagers employing embodiments described herein do not require costly external compensation layers to achieve the desired contrast and throughput.

Figure 17:
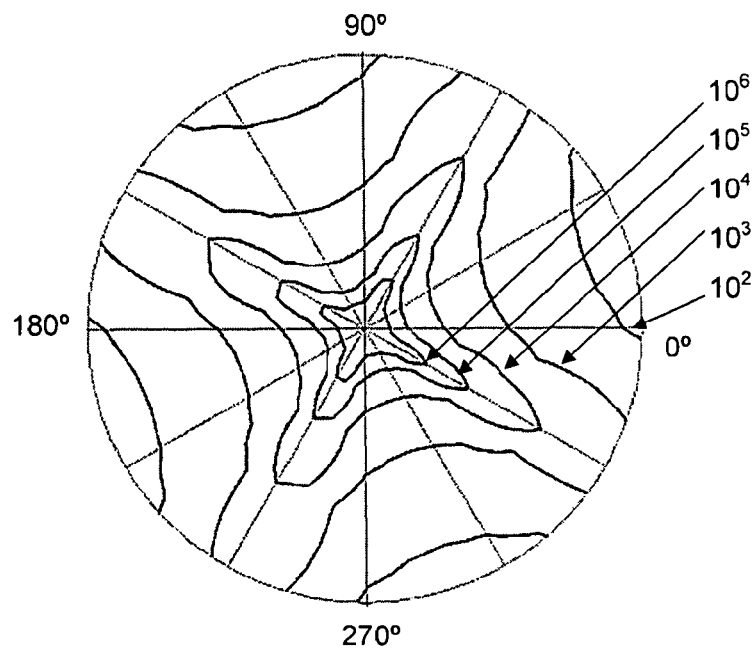
FIG. 17 presents, for an example a reflective device of the preferred embodiments in the case of an 80° pretilt angle and 121° twist angle, an iso-contrast diagram for the case in which the device has no external compensation.

For projection systems using highly collimated light such as light propagating from a laser source, the collection optics is typically about f/4.5 or slower. In such a system, no external compensation layer is required for liquid crystal display panels employing embodiments described herein, The iso-contrast diagram of FIG. 17 illustrates this case. In FIG. 17, the contrast ratio is indicated by isolines of constant contrast designated in powers of ten: $10^6$, $10^5$, $10^4$, $10^3$, and $10^2$. In this type of diagram, the polar viewing angle of incidence is indicated by the radial distance from the center of the figure, with the center representing straight-on viewing and the periphery representing an incident angle of 20°. The azimuthal viewing direction is indicated by the position around the circumference of the diagram. From FIG. 17, one can determine the contrast ratio at any particular viewing direction.

Figure 20:
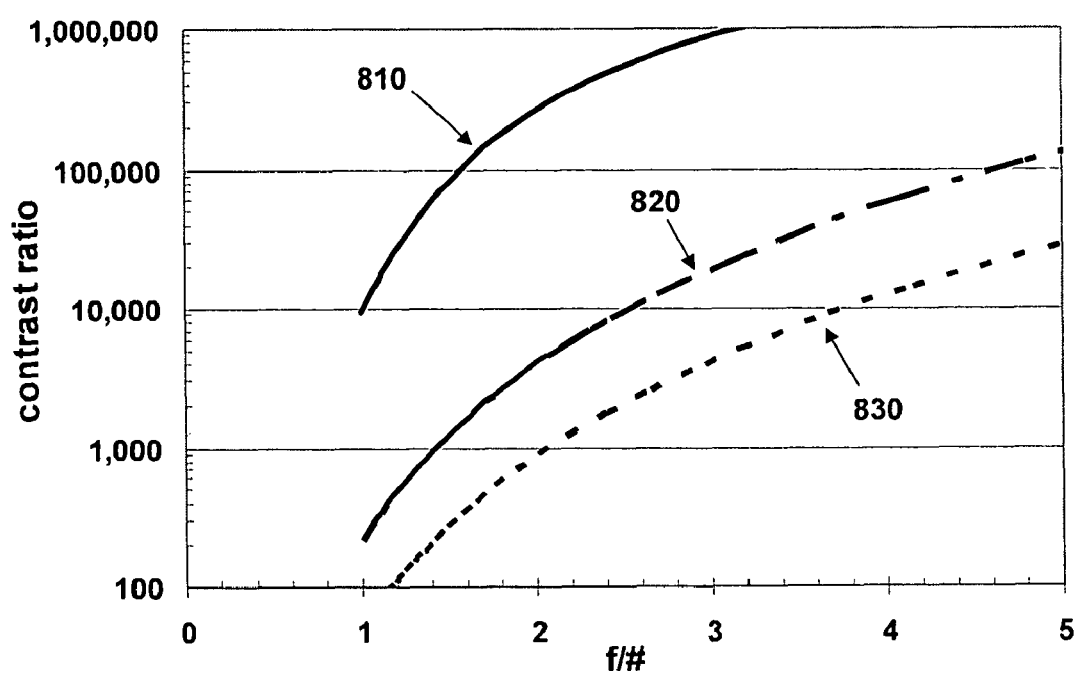
FIG. 20 presents, for an example a reflective device of the preferred embodiments for the systems described in FIGS. 17, 18, and 19, graphs of the contrast ratios as a function of the f number of the projection optics.

A projection system, however, collects the transmitted light intensity from many different directions. FIG. 20 shows the contrast ratio that would be obtained in a projection system as a function of the illumination and collection optics, conveniently characterized by an f number, or f/#. As illustrated by curve 830 in FIG. 20, the self-compensated device structure without external compensation provides a contrast ratio of over 15,000:1 at f/4.5, which is more than adequate to meet the most exacting requirements. The suppression of defects associated with the self-compensating structure provides a higher throughput to the system as well.

Figure 18:
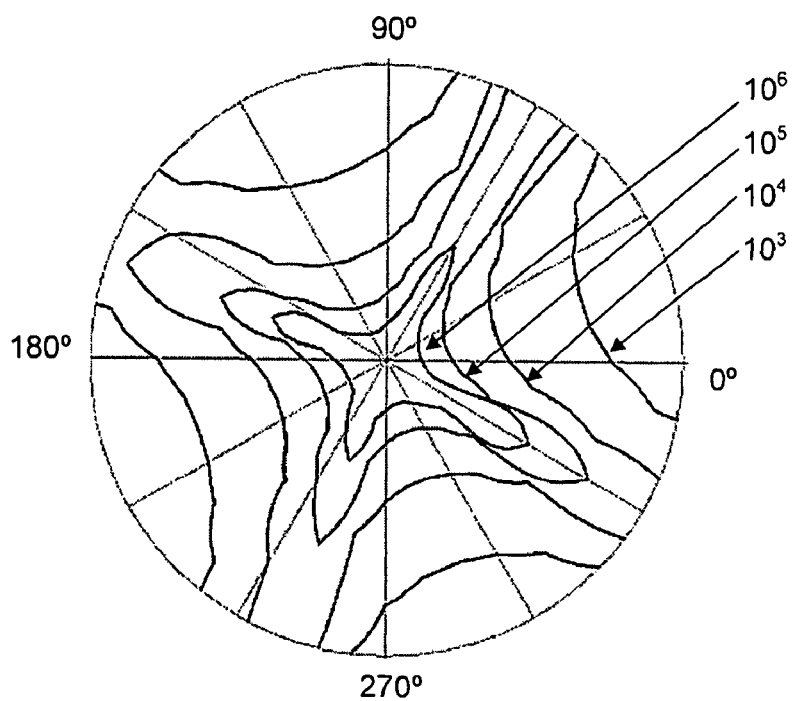
FIG. 18 presents, for an example a reflective device of the preferred embodiments in the case of an 80° pretilt angle and 121° twist angle, an iso-contrast diagram for the case in which the device is compensated with an external negative C retardation plate.

A more typical projection system employs a UHP metal-halide arc lamp as a light source with collection optics of f/2.4 or faster. In this case, liquid crystal imagers employing embodiments described herein require only a negative C retardation plate to compensate the off-axis birefringence that is intrinsic to the positive optical anisotropy of vertically aligned liquid crystal devices. An illustrative example is compensation of the 80° pretilt, 121° twisted reflective structure with a 215 nm negative C plate. The iso-contrast diagram for this case is presented in FIG. 18. Curve 820 in FIG. 20 shows for this case that the contrast ratio at f/2.4 is over 8000:1, well beyond the usual 2000:1 contrast requirement for this kind of projector.

Figure 19:
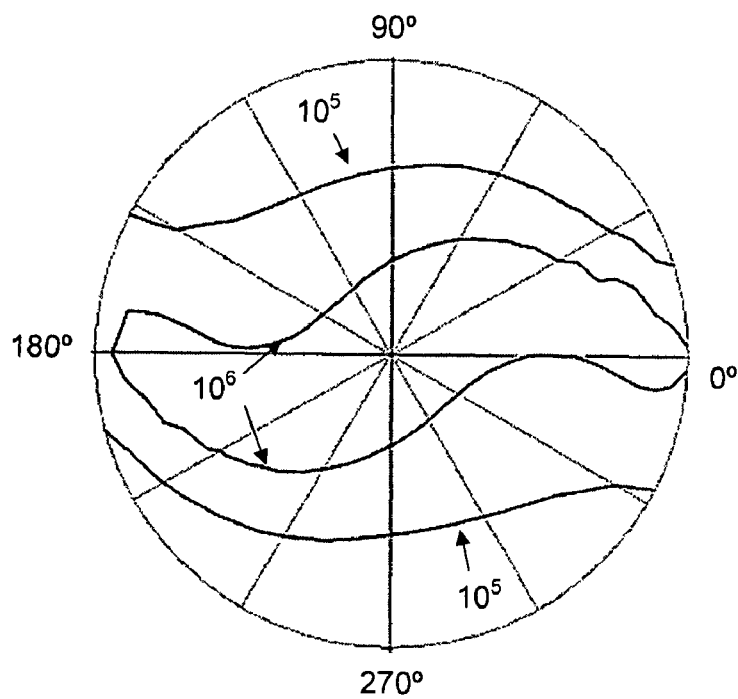
FIG. 19 presents, for an example a reflective device of the preferred embodiments in the case of an 80° pretilt angle and 121° twist angle, an iso-contrast diagram for the case in which the device is compensated with an external negative C retardation plate and an external positive A retardation plate.

Even higher contrast ratios are possible by compensating with both positive A plate and negative C plate retarders. An illustrative example is compensation of the 80° pretilt, 121° twisted reflective structure with a 137.5 nm uniaxial positive A plate oriented with its slow axis perpendicular to the input polarization direction of a wire-grid type polarizing beamsplitter followed by a 170 nm negative C plate. The results of this simulation are presented in the iso-contrast diagram of FIG. 19. FIG. 19 shows a central region where the contrast exceeds $10^6$, a larger region where the contrast exceeds $10^5$, and an outer region where the contrast exceeds $10^4$. Curve 810 in FIG. 20 shows that the contrast ratio is over 480,000 for f/2.4 projection optics.

It will be obvious to those having skill in the art that many changes may be made to the details of the above-described embodiments without departing from the underlying principles of the invention. The scope of the present invention should, therefore, be determined only by the following claims.

The invention claimed is:

1. A quasi-homeotropic liquid crystal device including a layer of nematic liquid crystal material, the liquid crystal device operable in response to a drive signal to switch to liquid crystal director field states between ON and OFF liquid crystal director field states to establish a polarization direction of linearly polarized light propagating from the layer of nematic liquid crystal material and configured to self-compensate for in-plane optical retardation in the OFF director field state, comprising:

a first electrode structure on which is placed a first alignment layer having a surface conditioned to define on it a first projected alignment direction and a second electrode structure on which is placed a second alignment layer having a surface conditioned to define on it a second projected alignment direction, the first and second alignment layer surfaces spaced apart from each other by a cell gap and arranged to form a liquid crystal cell that has the first and second projected alignment directions set at an offset angle relative to each other and that operates as characterized by an electro-optic transfer function associated with the ON and OFF director field states, the electro-optic transfer function having a subthreshold bias region;

a layer of nematic liquid crystal material captured between the spaced-apart first and second conditioned alignment layer surfaces, the nematic liquid crystal material having alignment layer surface contacting directors and alignment layer surface noncontacting directors and characterized in part by negative dielectric anisotropy and an intrinsic twist property;

the alignment surface contacting directors anchored at surface pretilt angles relative to the first and second conditioned alignment layer surfaces and the alignment surface noncontacting directors establishing a cell twist angle determined by the offset angle and the intrinsic twist property of the liquid crystal material; and the cell gap, intrinsic twist property, surface pretilt angles, and cell twist angle set at values that, in combination, contribute in response to the drive signal to establish for linearly polarized light propagating from the layer of nematic liquid crystal material a polarization direction rotation of between nearly 90 degrees and nearly 0 degrees in, respectively, the ON and OFF director field states, the OFF director field state corresponding to a subthreshold bias region level that provides for the liquid crystal device self-compensation for in-plane optical retardation.

2. The liquid crystal device of claim 1, in which one or more of the director field states is an intermediate director field state between the ON and OFF director field states.

3. The liquid crystal device of claim 1, in which, in the OFF director field state, the alignment surface noncontacting directors located in a generally planar surface midway between the conditioned first and second alignment layer surfaces reside at a midplane director tilt angle that is greater than or equal to an average of the surface pretilt angles.

4. The liquid crystal device of claim 1, in which the layer of nematic liquid crystal material is substantially free from intrinsic twist, in which the alignment surface noncontacting directors located in a generally planar surface midway between the conditioned first and second alignment layer surfaces reside at a midplane director tilt angle, and in which, in the absence of the drive signal, the midplane director tilt angle is about the average value of the surface pretilt angle and 90 degrees.

5. The liquid crystal device of claim 4, in which the cell twist angle is about 120 degrees.

6. The liquid crystal device of claim 1, in which, to provide self compensation, the cell twist angle is increased in response to an increase in subthreshold bias region level.

7. A quasi-homeotropic liquid crystal device including a layer of nematic liquid crystal material, the liquid crystal device operable in response to a drive signal to switch to liquid crystal director field states between ON and OFF liquid crystal director field states and configured to self-compensate for in-plane optical retardation in the OFF director field state, comprising:

a first electrode structure on which is placed a first alignment layer having a surface conditioned to define on it a first projected alignment direction and a second electrode structure on which is placed a second alignment layer having a surface conditioned to define on it a second projected alignment direction, the first and second alignment layer surfaces spaced apart from each other and arranged to form a liquid crystal cell that has the first and second projected alignment directions set at an offset angle relative to each other and that operates as characterized by a contrast ratio associated with the ON and OFF director field states;

a layer of nematic liquid crystal material captured between the spaced-apart first and second conditioned alignment layer surfaces, the nematic liquid crystal material having alignment layer surface contacting directors and alignment layer surface noncontacting directors and characterized in part by negative dielectric anisotropy and an intrinsic twist property;

the alignment surface contacting directors anchored at surface pretilt angles relative to the first and second conditioned alignment layer surfaces and the alignment surface noncontacting directors establishing a cell twist angle determined by the offset angle and the intrinsic twist property of the nematic liquid crystal material; and the surface pretilt angles and cell twist angle set at values that, in combination, contribute to establish a cuspate singularity in the contrast ratio in response to a value of the drive signal switching the liquid crystal device to the OFF director field state providing self-compensation for in-plane optical retardation.

8. The liquid crystal device of claim 7, in which one or more of the director field states is an intermediate director field state between the ON and OFF director field states.

9. The liquid crystal device of claim 7, in which the first and second alignment layer surfaces are spaced apart by a cell gap, and in which the cell gap is set to provide substantially 100% optical efficiency in response to a value of the drive signal switching the liquid crystal device to the ON director field state.

10. The liquid crystal device of claim 7, in which the first and second alignment layer surfaces are spaced apart by a cell gap, and in which the cell gap is set to provide less than 100% optical efficiency in response to a value of the drive signal switching the liquid crystal device to the ON director field state and thereby provide between the ON and OFF director field states a switching time that is shorter than an achievable switching time between the ON and OFF director field states for the cell gap set to provide substantially 100% optical efficiency.

11. The liquid crystal device of claim 7, in which, in the OFF director field state, the alignment surface noncontacting directors located in a generally planar surface midway between the conditioned first and second alignment layer surfaces reside at a midplane director tilt angle that is greater than or equal to an average of the surface pretilt angles.

12. The liquid crystal device of claim 7, in which the intrinsic twist property of the nematic liquid crystal material imparts essentially no intrinsic twist, in which the alignment surface noncontacting directors located in a generally planar surface midway between the conditioned first and second alignment layer surfaces reside at a midplane director tilt angle, and in which, in the absence of the drive signal, the midplane director tilt angle is about the average value of the surface pretilt angle and 90 degrees.

13. The liquid crystal device of claim 12, in which the cell twist angle is about 120 degrees.

14. The liquid crystal device of claim 7, in which the cell twist angle is between about 100 degrees and 165 degrees.

15. The liquid crystal device of claim 7, in which each of the surface pretilt angles is between 75 degrees and 85 degrees.

16. The liquid crystal device of claim 7, in which the surface pretilt angles are of the same value.

17. The liquid crystal device of claim 7, in which the liquid crystal cell operates as characterized by an electro-optic transfer function associated with the ON and OFF director field states, the electro-optic transfer function having a subthreshold bias region, and in which the cell twist angle and subthreshold bias region level are related such that an increase in the subthreshold bias region level entails a corresponding increase in the cell twist angle to provide self-compensation.

18. The liquid crystal device of claim 7, in which the intrinsic twist property of the nematic liquid crystal material imparts non-zero intrinsic twist, in which the alignment surface noncontacting directors located in a generally planar surface midway between the conditioned first and second alignment layer surfaces reside at a midplane director tilt angle, and in which, in the absence of the drive signal, the midplane director tilt angle is greater than the surface pretilt angle.

19. The liquid crystal device of claim 7, in which one of the first and second electrode structures includes optically reflective material.

20. The liquid crystal device of claim 19, in which the one of the first and second electrode structures is in the form of individual reflective metallic pixel electrodes.

21. The liquid crystal device of claim 7, in which the first and second electrode structures are optically transparent.

22. The liquid crystal device of claim 7, further comprising light collection optics and an optical retarder of a retardation value compensating for off-axis birefringence contributed at least in part by the positive optical anisotropy characterizing the layer of liquid crystal material.

23. The liquid crystal device of claim 22, in which the optical retarder constitutes a first optical retarder of a negative C type, and further comprising a second optical retarder of a positive A type cooperating with the first optical retarder to provide the contrast ratio of a value that is greater than a value of contrast ratio achievable by the first optical retarder in the absence of the second optical retarder.

* * * * *